United States Patent [19]

Hauer et al.

[11] Patent Number: 4,738,134
[45] Date of Patent: Apr. 19, 1988

[54] INK TRANSFER VOLUME MEASURING ASSEMBLY

[75] Inventors: Horst-Walter Hauer; Willi A. P. Kutzner; Georg Schneider, all of Wurzburg, Fed. Rep. of Germany

[73] Assignee: Koenig & Bauer Aktiengesellschaft, Fed. Rep. of Germany

[21] Appl. No.: 26,805

[22] Filed: Mar. 17, 1987

[30] Foreign Application Priority Data

Mar. 21, 1986 [DE] Fed. Rep. of Germany ....... 3609625

[51] Int. Cl.⁴ .......................................... G01M 19/00
[52] U.S. Cl. ....................................... 73/149; 73/306; 73/865.9; 101/DIG. 24
[58] Field of Search ................... 73/149, 865.8, 865.9, 73/306, 307, 308, 150 R; 101/DIG. 24

[56] References Cited

U.S. PATENT DOCUMENTS

| | | | |
|---|---|---|---|
| 479,482 | 7/1892 | Wright | 73/307 |
| 1,939,814 | 12/1933 | Hoch | 73/150 R |
| 2,076,095 | 4/1937 | Rolls | 73/865.9 X |
| 4,284,005 | 8/1981 | Wiegele et al. | 101/DIG. 24 |
| 4,628,728 | 12/1986 | Taylor et al. | 73/149 |

FOREIGN PATENT DOCUMENTS 7609978 9/1976 Fed. Rep. of Germany.
2701045 7/1977 Fed. Rep. of Germany.

OTHER PUBLICATIONS

"Ergiebigkeit von Tiefdruckfarben . . . ", Fogra Forschungsbericht, 5.304, 1980, pp. 1-35.

*Primary Examiner*—Tom Noland
*Attorney, Agent, or Firm*—Jones, Tullar & Cooper

[57] ABSTRACT

An ink transfer volume measuring assembly utilizes a front, resilient surfaced roller and a rear, hard surfaced roller carried in a hand held, portable housing. The front roller is pried against the surface of a screened ink roller and receives ink therefrom. This ink is transferred from the soft front roller to the rear hard roller where it is scraped off by a doctor blade. The ink removed from the rear roller is deposited in a collecting container where its volume is measured by using a float that carries an indicating pointer. A revolution counter is driven by the front roller to provide a measurement of collection time.

7 Claims, 3 Drawing Sheets

INK TRANSFER VOLUME MEASURING ASSEMBLY

FIELD OF THE INVENTION

The present invention is directed generally to an ink transfer volume measuring assembly. More particularly, the present invention is directed to an assembly for measuring the volume of ink transferred by a screened ink roller. Most specifically, the present invention is directed to a hand held, portable ink transfer volume measuring assembly for determining ink volume transfer capabilities of screened ink transfer rollers. The ink transfer volume measuring assembly includes a pair of cooperating rollers, one of which may be brought into contact with the screened ink transfer roller whose ink volume transfer capabilities are to be measured.

DESCRIPTION OF THE PRIOR ART

In various printing press assemblies it is well known to use screened on Anilox ink transfer rollers to transport ink from an ink supply to a printing plate. These screened ink transport rollers have a large number of very small surface depressions or recesses that hold ink during transport. A typical screened ink roller may have up to 40,000 recesses per $cm^2$. These ink rollers are often typically employed as ink fountain rollers in printing units of sheet-fed rotary printing machines. In printing press assemblies of this type, ink is initially applied to the surface of the screened ink transport roller so that its face is covered with ink. A doctor blade is then typically used to scrape excess ink off the peripheral face of the screened ink transport roller so that printing ink is left only in the recesses of the screened ink roller. The screened ink roller then contacts an inking roller which carries the ink from the screened surface ink roller to an ink using device such as a printing plate. The ink filled recesses in the screened surface ink roller are only partially emptied of ink during line contact with the inking roller. Generally about 40 to 60% of the printing ink taken up by the recesses on the surface of the screened ink roller remain in the recesses of the roller after contact with the inking roller. This percentage will vary among screened rollers according to various factors such as the physical properties of the ink being transported and the geometric shape of the recesses.

In accordance with prior art practices it has been necessary to make a plurality of sample prints so that the ink transfer characteristics of a group of screened ink rollers may be ascertained. Each screened ink roller is placed in an inking unit in a press assembly and is operated to produce sample prints. When it is desired to obtain a desired amount of ink on an ink carrier, a plurality of these trials must be conducted. It will be appreciated that such trials require substantial production outages as the various screened ink rollers are tried.

It will readily be apparent that a need exists for a more efficient and less time consuming procedure to quantify the amount of ink that a screened surface ink roller is capable of passing on to an inking roller. The ink transfer Volume measuring assembly in accordance with the present invention provides such an assembly.

SUMMARY OF THE INVENTION

It is an object of the present invention to provide an ink transfer volume measuring assembly.

Another object of the present invention is to provide an ink transfer volume measuring assembly for use with a screened ink roller.

A further object of the present invention is to provide an ink transfer volume measuring assembly that is transportable.

Yet another object of the present invention is to provide an ink transfer volume measuring assembly that provides a reproducable measurement of ink tranefer volumes.

Still a further object of the present invention is to provide an ink transfer volume measuring assembly which measures the volume of ink passed from a screened ink roller to a roller having a resilient cover.

Yet still another object of the present invention is to provide an ink transfer volume measuring assembly that is reliable and of uncomplicated construction.

As will be discussed in greater detail in the description of the preferred embodiment which is set forth subsequently, the ink transfer volume measuring assembly in accordance with the present invention utilizes a pair of cooperating rollers carried in a hand held housing. A first, or front roller has a resilient oleophilic covering and is positionable to contact the screened surface of a screened ink roller. A second, or rear roller has a hard oleophilic surface and receives ink from the front roller. A doctor blade removes the ink from this rear roller and transfers it to a printing ink collecting chamber where the volume of ink collected is measured through the use of a float and pointer assembly.

The ink transfer volume measuring assembly of the present invention has several advantages over prior art devices and methods. A particular advantage is that the amount of ink which a screened ink roller can pass on to an inking roller can be exactly measured without the screened ink roller having to have been installed in a printing unit of a rotary printing machine. The screen ink roller can be placed in an ink fountain and its ink transfer volume can be ascertained without relying on the need to make a plurality of printing samples. These advantages result in substantial time savings and reduce printing machine downtime.

The ink transfer volume measuring assembly of the present invention also has the advantage of being able to take ink volume transfer measurements at various locations about the periphery of a screened ink roller. This is accomplished by placing the hand held assembly of the present invention against the screened roller at any desired location along the screened roller's length. This allows areas of possibly varying ink transfer yields on a screened ink roller to be ascertained and considered in the selection of a particular screened ink roller.

The ink transfer volume measuring assembly of the present invention is not overly complex in structure and is readily portable to facilitate its being used where desired. The mechanical ink volume measuring and indicating mechanisms of the present invention also allows the present assembly to be manufactured and maintained in an inexpensive manner. It will thus be seen that the ink transport volume measuring assembly of the present invention provides an effective, reliable, uncomplicated assembly at a cost which is not prohibitive.

BRIEF DESCRIPTION OF THE DRAWINGS

While the novel features of the ink transfer volume measuring assembly in accordance with the present invention are set forth with particularity in the appended claims, a full and complete understanding of the invention may be had by referring to the detailed description of the preferred embodiment as it set forth hereinafter and as is illustrated in the accompanying drawings in which:

DESCRIPTION OF THE PREFERRED EMBODIMENT

Figure 2:
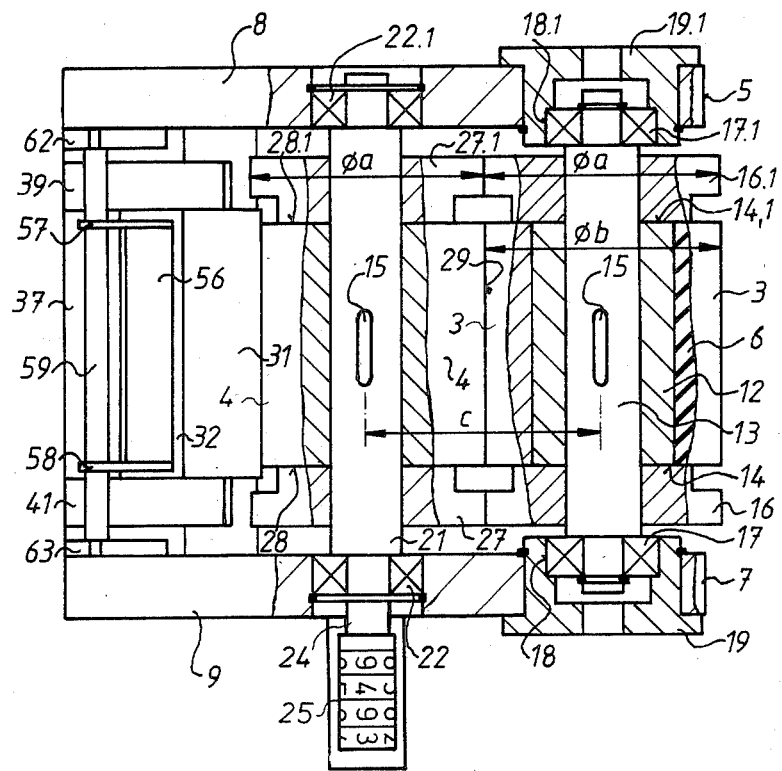
FIG. 2 is a top plan view, again partly in section, of the measuring assembly of the present invention.

Turning initially to FIG. I, there may be seen a preferred embodiment of the ink transfer volume measuring assembly of the present invention. A generally U-shaped, light weight housing 2 carries two rollers 3 and 4 that are supported for rotation and that contact each other. A front or screened ink roller contacting roller 3 has a peripheral surface 6 which protrudes by, for example 5 mm, beyond or in front of front edges 5 and 7 of side walls 8 and 9, respectively of assembly housing 2. This periphery 6 of front roller 3 consists of an elastic, oleophilic material euch as rubber. Resilient periphery 6 of front roller 3 is generally cylindrical in shape, and as may be seen in FIG. 2, is carried on an inner hub 12 that is slotted on its inside and that is, in turn, mounted on a shaft 13 by means of a fitted key 15 so as to be rotatable with shaft 13. This shaft 13 is rotatably supported in side walls 8 and 9. Spaced bearer rings 16 and 16.1 are detachably secured to end faces 14 and 14.1, respectively of hub 12. Each of these bearer rings 16 and 16.1 has a diameter "a" that is slightly smaller, for example by approximately 0.1 mm, than a diameter "b" of the periphery 6 of front roller 3. Shaft 13 is supported at its ends outboard of bearer rings 16 and 16.1 by two anti-friction bearings 17 and 17.1. Outer rings or races 18 and 18.1 of these front roller supporting bearings 17 and 17.1 are pressed into eccentric bushings 19 and 19.1. These bushings are rotatably supported in the side walls B and 9 of the U-shaped housing 2.

The rear or ink receiving roller 4 is supported on a shaft 21 and is keyed thereto by a key 15. Shaft 21 is spaced at a distance "c" from the shaft 13 of front roller 3 and is supported in side walls 8 and 9 by suitable anti-friction bearings 22 and 22.1 respectively. Roller 4 has a hard oleophilic periphery which may be a polyamid or the like. As may be seen in FIGS. 1 and 2, the peripheral surfaces 6 of front roller 3 and 29 of rear roller 4 are in contact with each other. An end 24 of rear roller shaft 21 passes through its supporting bearing 22 and serves to drive a revolution counter 25 which is used to count the number of reVolutions of rear roller 4. Bearer rings 27 and 27.1 are secured to respective end faces 28 and 28.1 of the rear roller 4. The bearer rings 16 and 16.1 of front cylinder 3 contact the bearer rings 27 and 27.1 of rear roller 4 thereby ensuring an adjustable constant axial separation distance "c" between rollers 8 and 4. To accommodate for wear or other such factors, the spacing "c" can be adjusted by suitable rotation of the eccentric bushings 19 and 19.1 in side walls 9 and 8.

Figure 1:
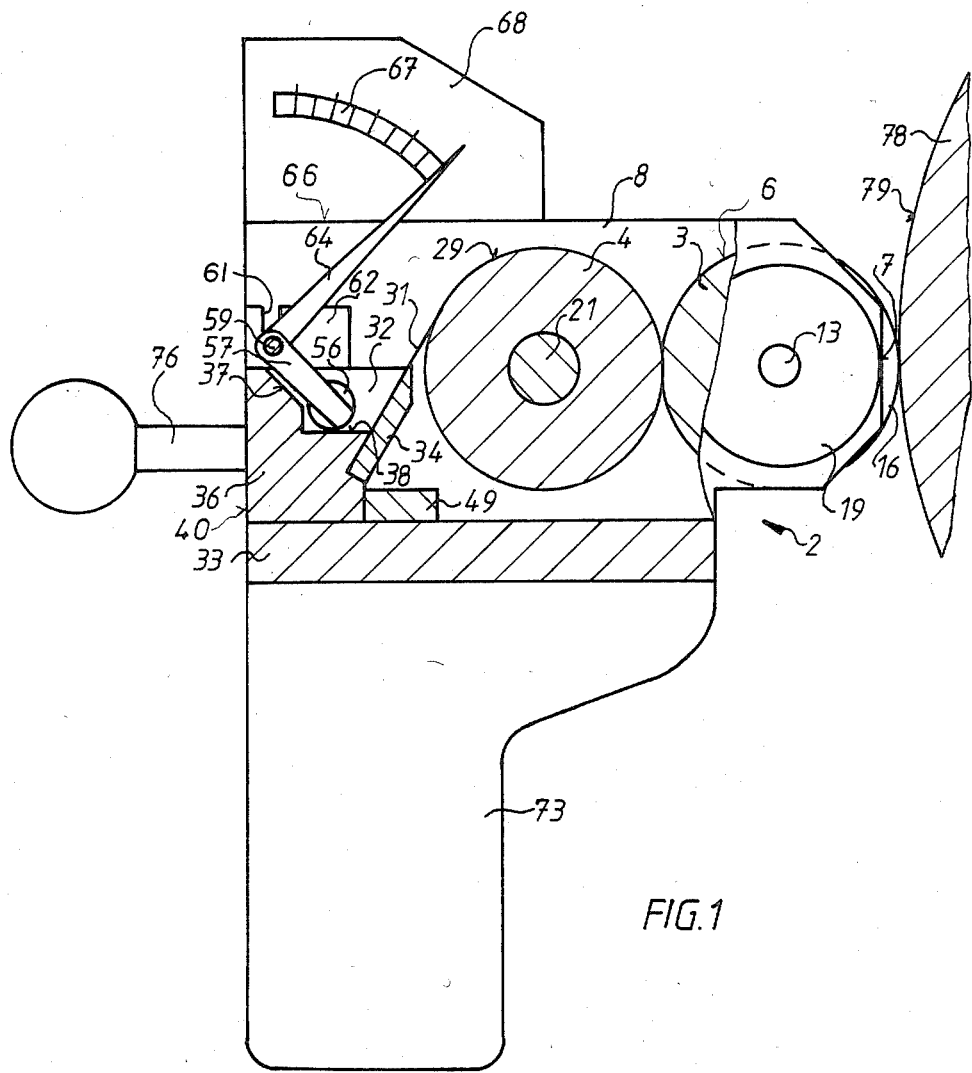
FIG. 1 a side elevation view, partly in section, of the ink transfer volume measuring assembly in accordance with the present invention.

An overshot doctor blade 31 is positioned to contact the outer periphery 29 of rear roller 4, as may best be seen in FIG. 1. This doctor blade 31 is secured to a front wall portion 34 of a printing ink collecting container 32 which is provided to receive and store printing ink that is scraped or removed from the peripheral cover 29 of rear roller 4 by doctor blade 31. The doctor blade 31 is inclined, preferably at an angle of generally about 60°, with respect to a floor plate 33 of the housing 2 of the ink transfer volume measuring assembly of the present invention.

Printing ink collecting container 32 is additionally comprised of a rear wall 37 and a floor portion 38 which are both part of an angled member 86. A pair of spaced, generally L-shaped side walls 89 and 41 are secured to the sides of the angle piece 36 in a fluid tight manner to complete the formation of printing ink collection container 32. As may best be seen in FIG. 3, side walls 39 and 41 carry lower, outwardly projecting horizontal flanges 39.1 and 41.1, respectively. These flanges are slidable along the floor plate 88 of housing 2 and between side walls 8 and 9 thereof to guide printing ink receiving container 82 during movement of the container 32 into or out of the housing 2. This movement allows the printing ink receiving container 32 to be easily removed from housing 2 for cleaning. A pair of rectangular guide blocks 47 and 48 are secured to the side walls 8 and 9, respectively of housing 2 and act as upper guides for horizontal flanges 39.1 and 41.1. A front stop 49, as may be seen in FIG. 1 is secured to the floor plate 33 of housing 2 to further determine the final position of the printing ink collecting container 82 in housing 2.

Figure 3:
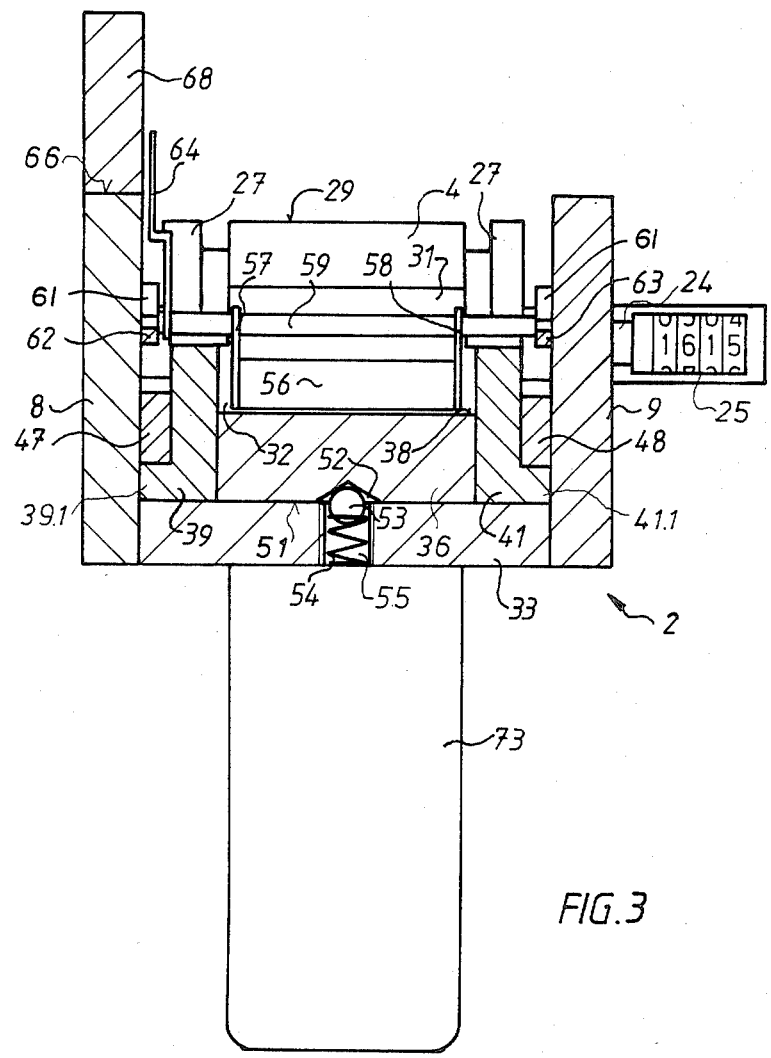
FIG. 3 is a rear elevation view, partly in section, of the measuring assembly of FIGS. 1 and 2.

A recess 52 is formed in an undersurface 51 of angle member 36, as may also be seen in FIG. 3. A ball 53, which is biased upwardly by a spring 54 that is positioned in a borehole 55 in the floor plate 33 of housing 2, is received in recess 52 in angle piece 36 when the printing ink collecting container 32 has been properly positioned in housing 2. This ball and detent assembly thus insures that the printing ink collecting container 32 and thus doctor blade 31 are properly located for use where collecting container 32 is slid into housing 2.

An elongated cylindrical float 56 is situated in the printing ink collecting container 32. This float 56 is carried by an elongated pivot rod 59 which is, in turn supported by a pair of spaced bearing blocks 62 and 63 that are secured to the side walls 8 and 9, respectively of housing 2. A pair of spaced float support arms 57 and 58 are secured at first ends to the pivot rod 59 and at second ends to the float 56. This float 56 is freely suspended within ink collecting container 82 and can float on the upper surface of whatever amount of ink may be collected in collecting container 32. As may be seen in FIGS. 1 and 3, the pivot rod bearing blocks 62 and 63 have slots 61 which receive the ends of the pivot rod 59. Thus, the float 56 can be easily removed from the ink collecting container 32.

A pointer 64, as is shown most clearly in FIG. 1, is secured to one end of pivot rod 59 at a predetermined angle with respect to the two float support arms 57 and 58. This pointer 64 protrudes above sidewall 8 of housing 2 and terminates in a free end that is located adjacent a calibrated scale 67 which is positioned on an interior surface of a side wall extension plate 68. Scale 67 is calibrated to provide a measure of the amount of scraped off ink that is received in ink collecting container 32. As float 56 moves upwardly on ink accumulated in container 32, pointer 64 moves from right to left across scale 67, as seen in FIG. 1

The ink transfer volume measuring assembly of the present invention, as gas previouely alluded to, is intended to be hand held and is portable. To facilitate this, there is provided a downwardly extending hand grip 73 which is secured to the central lower surface of floor plate 88. A rearwardly extending grip 76 is also provided, and is attached to outer wall 40 of angle piece 86. Thus the user of the ink transfer volume measuring assembly can readily hold and position the assembly by using hand grip 73 and grip 76.

When the ink transfer volume measuring assembly is to be utilized, and before actually starting ink collection, the distance "c" between shafts 13 and 21 of rollers 3 and 4 is adjusted by rotation of the eccentric bushing supports 19 and 19.1 to a point where the bearer rings 16 and 16.1 and 27, 27.1 of rollers 3 and 4, respectively roll against each other with a light contact force. The ink transfer volume measuring assembly is then positioned so that the front roller 3 is manually pressed against a surface portion 79 of a screened ink roller 78, as seen in FIG. 1. Since the surface or peripheral portion 6 of front roller 3 is a resilient material, and further since the diameter of front roller bearer rings 16, 16.1 are less than the diameter of front roller 3, a defined press-on force may be exerted by front roller 3 against the screened ink roller's peripheral surface 79. Also, since bearer rings 16, 16.1 of front roller 3 and bearer rings 27, 27.1 of rear roller 4 have a certain contact force, the pressure between front and rear rollers 3 and 4 is maintained at a constant level.

Printing ink is taken off the recessed surface 79 of screened ink roller 78 by the oleophilic periphery 6 of front roller 3. This printing ink is then transferred from resilient oleophilic periphery 6 of front roller 3 to the oleophilic hard surface 29 of rear roller 4. The doctor blade 31 then scrapes this collected ink off surface 29 of rear roller 4. This collected ink then flows down the inclined surface of doctor blade 31 and collects in the printing ink collecting container 32. As the amount of ink collected in container 32 increases, the float 56 is caused to rise. This elevation of float 56 causes pointer 64 to move along scale 67. By comparing an initial scale reading with a final scale reading, a measurement of the volume of ink collected is arrived at.

It will be recalled that an end 24 of shaft 21 of rear roller 4 is connected to a revolution counter 28. By comparing starting and finishing values of counter 25, the number of revolutions of 4 can be determined. Assuming no slippage between rear roller 4 and front roller 8, and between front roller 3 and screened ink roller 78, the number of revolutions of screened ink roller 78 can then be determined. Since the surface area of the periphery 6 of front ink roller 3 is known as A, and the number of revolutions of front roller 3 are know, as provided by the revolution counter 25 and are designated as U, and further since the amount of scraped off printing ink V has been determined by measurements taken from calibrated scale 67, the specific practical amount of passed on printing ink Vsp of the screened ink roller 78 can be calculated in accordance with the formula $$V_{sp} = \frac{V}{A \times U} \ [cm^3/cm^2]$$

wherein V is inserted in $cm^3$ and A is inserted in $cm^2$.

After the ink transfer volume measuring assembly of the present invention hae been used, the printing ink collecting container 32 can be removed from housing 2 by using grip 76, and can be cleaned. Before container 32 is removed, the float 56 should be removed by sliding pivot rod 59 upwardly out of the slots 61 in bearing blocks 62 and 63. The ink transfer volume measuring aaaembly of the present invention can thus be quickly and easily cleaned and made ready for subsequent uses. Since it has a relatively uncomplicated structure, it is apt not to require much maintenance and is easy to operate and service. Furthermore, it is not particularly expensive to purchase or keep up.

While a full and complete description of an ink tranefer volume measuring assembly in accordance With the present invention has been set forth hereinabove, it will be apparent to one of skill in the art that a number of changes in for example, the various overall sizes of the rollers, the type of rollers used, the various bearing assemblies and the like could be made without departing from the true spirit and gcope of the present invention which is accordinglV to be limited only by the following claims.

What is claimed is:

1. An ink transfer volume measuring assembly usable to measure a volume of ink passed on by a screened ink roller, said ink transfer volume measuring assembly comprising:
    a front roller and a rear roller, said front and rear rollers being positioned in peripheral contact with each other in a portable housing, said front roller having a resilient oleophilic periphery and said rear roller having a hard oleophilic periphery;
    first spaced bearer rings secured to said front roller and second spaced bearer rings secured to said rear roller, said first bearer rings being in rolling contact with said second bearer rings, said resilient periphery of said front roller having a larger diameter than said first bearer rings;
    a doctor blade positionable to contact said hard periphery of said rear roller; and
    a printing ink collecting container carried by said portable housing to receive ink removed by said doctor blade, said printing ink collecting container having ink volume measuring and indicating means, said assembly further including a revolution counter.

2. The ink transfer volume measuring assembly of claim 1 wherein said printing ink collecting container is removably carried by said portable housing.

3. The ink transfer volume measuring assembly of claim 1 wherein said ink volume measuring and indicating means includes a float supported for movement in said printing ink collecting container and a pointer secured to said float.

4. The ink transfer volume measuring assembly of claim 1 wherein said revolution counter is coupled to a shaft of said rear roller.

5. The ink transfer volume measuring assembly of claim 1 wherein said portable housing includes spaced side walls and a floor plate and further wherein a hand grip extends downwardly from said floor plate.

6. The ink transfer volume measuring assembly of claim 5 wherein said printing ink collecting container is removably supported by said floor plate and further is guided by said spaced side walls.

7. The ink transfer volume measuring assembly of claim 6 wherein said printing ink collecting container includes side walls, said container side walls being provided with lower horizontal flanges, said flanges being slidably received between said floor plate and guide blocks secured to said housing side walls.

* * * * *